United States Patent
Perla et al.

(10) Patent No.: US 8,078,791 B1
(45) Date of Patent: Dec. 13, 2011

(54) ORDERING REFRESH REQUESTS TO MEMORY

(75) Inventors: Srinivas Perla, San Jose, CA (US); Anjan Venkatramani, Los Altos, CA (US); John Keen, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 517 days.

(21) Appl. No.: 11/829,638

(22) Filed: Jul. 27, 2007

Related U.S. Application Data

(60) Provisional application No. 60/911,974, filed on Apr. 16, 2007.

(51) Int. Cl.
*G11C 11/406* (2006.01)

(52) U.S. Cl. ............................. 711/5; 711/106

(58) Field of Classification Search .................. 711/106, 711/151, 158
See application file for complete search history.

(56) References Cited

U.S. PATENT DOCUMENTS

| | | | | |
|---|---|---|---|---|
| 5,265,231 A | * | 11/1993 | Nuwayser | 711/106 |
| 5,873,114 A | * | 2/1999 | Rahman et al. | 711/106 |
| 5,966,725 A | * | 10/1999 | Tabo | 711/106 |
| 6,115,768 A | * | 9/2000 | Yamamoto | 710/107 |
| 6,119,199 A | * | 9/2000 | Isobe | 711/5 |
| 6,226,709 B1 | * | 5/2001 | Goodwin et al. | 711/106 |
| 6,298,413 B1 | * | 10/2001 | Christenson | 711/106 |
| 6,360,285 B1 | * | 3/2002 | Fenwick et al. | 710/17 |
| 6,434,082 B1 | * | 8/2002 | Hovis et al. | 365/233.16 |
| 6,650,586 B1 | * | 11/2003 | Fanning | 365/222 |
| 6,871,261 B1 | * | 3/2005 | Proebsting | 711/106 |
| 6,920,523 B2 | * | 7/2005 | Le et al. | 711/106 |
| 2002/0060940 A1 | * | 5/2002 | Tomita | 365/222 |
| 2002/0112117 A1 | * | 8/2002 | Suh | 711/106 |
| 2003/0081483 A1 | * | 5/2003 | De Paor et al. | 365/222 |
| 2003/0120861 A1 | * | 6/2003 | Calle et al. | 711/105 |
| 2005/0013185 A1 | * | 1/2005 | Kim et al. | 365/222 |
| 2007/0086261 A1 | * | 4/2007 | Freebern | 365/230.03 |
| 2007/0239930 A1 | * | 10/2007 | Hearn | 711/106 |
| 2010/0128547 A1 | * | 5/2010 | Kagami | 365/222 |

FOREIGN PATENT DOCUMENTS

WO    WO 2007/013340 A1 * 1/2007

OTHER PUBLICATIONS

Toshiaki Kirihata, Paul Parries, David Hanson, Hoki Kim, John Golz, Gregory Fredeman, Raj Rajeevakumar, John Griesemer, Norman Robson, Alberto Cestero, Matt Wordeman, and Subramanian Iyer. "An 800MHz Embedded DRAM with a Concurrent Refresh Mode." 2004. IEEE. ISSCC 2004.*
American Heritage® Dictionary of the English Language. 2007. Houghton Mifflin. Definition of determine.*
JEDEC. "DDR3 SDRAM Specification." Apr. 2008. JEDEC. JESD79-3B. pp. 55-77 and 157-163.*
Micron Technical Note, "Various Methods of DRAM Refresh", Micron Technology Inc, TN-04-30, Feb. 1999, 4 pages.
T.H. Cormen et al., "Chapter 17, Greedy Algorithms" *Introduction to Algorithms*, MIT Electrical Engineering and Computer Science Series, Copyright date 1990, pp. 329-355, 35 pgs.

* cited by examiner

*Primary Examiner* — Reginald Bragdon
*Assistant Examiner* — Nathan Sadler
(74) *Attorney, Agent, or Firm* — Harrity & Harrity, LLP

(57) ABSTRACT

A device may generate a refresh signal that identifies a beginning of a refresh interval, determine the availability of banks of a memory device, and send refresh requests to the banks during the refresh interval based on the availability of the banks.

20 Claims, 11 Drawing Sheets

| CLOCK CYCLE | 0 | 1 | 2 | 3 | 4 | 5 | 6 | 7 | 8 | 9 | 10 |
|---|---|---|---|---|---|---|---|---|---|---|---|
| BANK 1 → NA | — | — | — | X | NA | NA | NA | — | — | — | — |
| BANK 2 → AV | — | — | — | — | X | NA | NA | NA | — | — | — |
| BANK 3 → AV | — | — | — | — | — | X | NA | NA | NA | — | — |
| BANK 4 → NA | — | — | — | — | — | — | X | NA | NA | NA | — |
| BANK 5 → AV | — | — | — | — | — | — | — | X | NA | NA | NA |
| BANK 6 → NA | — | — | — | — | — | — | — | — | X | NA | NA |
| BANK 7 → AV | — | — | — | — | — | — | — | — | — | X | NA |
| BANK 8 → AV | — | — | — | — | — | — | — | — | — | — | X |
| BANK SERVICED: | — | — | — | 1 | 2 | 3 | 4 | 5 | 6 | 7 | 8 |

FIG. 10

AV: AVAILABLE
NA: NOT AVAILABLE
—: IDLE CLOCK CYCLE
X: BANK SERVICED

| CLOCK CYCLE | 0 | 1 | 2 | 3 | 4 | 5 | 6 | 7 | 8 | 9 | 10 |
|---|---|---|---|---|---|---|---|---|---|---|---|
| BANK 2 → AV | X | NA | NA | NA | — | — | — | — | — | — | — |
| BANK 3 → AV | — | X | NA | NA | NA | — | — | — | — | — | — |
| BANK 5 → AV | — | — | X | NA | NA | NA | — | — | — | — | — |
| BANK 1 → NA | — | — | — | X | NA | NA | NA | — | — | — | — |
| BANK 4 → NA | — | — | — | — | X | NA | NA | NA | — | — | — |
| BANK 6 → NA | — | — | — | — | — | X | NA | NA | NA | — | — |
| BANK 7 → AV | — | — | — | — | — | — | X | NA | NA | NA | — |
| BANK 8 → AV | — | — | — | — | — | — | — | X | NA | NA | NA |
| BANK SERVICED: | 2 | 3 | 5 | 1 | 4 | 6 | 7 | 8 | | | |

FIG. 11

AV : AVAILABLE
NA : NOT AVAILABLE
— : IDLE CLOCK CYCLE
X : BANK SERVICED

US 8,078,791 B1

ORDERING REFRESH REQUESTS TO MEMORY

RELATED APPLICATION

This application claims priority from U.S. Provisional Application No. 60/911,974, filed Apr. 16, 2007, entitled "MEMORY SCHEMES," the content of which is hereby incorporated by reference.

BACKGROUND

Network devices, such as routers, receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was added.

To meet the new demands, purpose-built routers were designed. Purpose-built routers are designed and built with components optimized for routing. These routers not only handle higher line rates and higher network traffic volume, but they also add functionality without compromising line rate performance.

SUMMARY

According to one aspect, a data processing device may include a memory and a control block. The memory may include a number of banks. The control block may generate a refresh signal, determine an availability of the banks, determine an order for sending refresh requests to the banks based on the refresh signal and the availability of the banks, and send one of the refresh requests to the memory based on the determined order.

According to another aspect, a device may include means for generating a refresh signal to signify a beginning of a refresh interval; means for determining an availability of banks of a memory device; means for determining an order for sending refresh requests to the banks during the refresh interval based on the availability of the banks; and means for sending one of the refresh requests to one of the banks based on the determined order.

According to yet another aspect, a method may include periodically generating a refresh signal to identify a beginning of a refresh interval; determining an availability of banks of a memory device; and sending refresh requests to the banks during the refresh interval based on the availability of the banks.

According to a further aspect, a data processing device may include a memory and a control block. The memory may include a number of banks. The control block may generate a refresh signal to identify a beginning of a refresh interval, determine an order for sending refresh requests to the banks during the refresh interval based on a bank access delay associated with the banks, and send one of the refresh requests to one of the banks based on the determined order.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 10 is a diagram that illustrates a round robin order for servicing refresh requests; and FIG. 11 is a diagram that illustrates an order for servicing refresh requests based on bank availability.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein provide techniques for ordering refresh requests for refreshing banks of a memory device. In the description to follow, the memory device will be described as a control memory of a network device that stores data structures for use in processing packets. In other implementations, the memory device may be included in another type of data processing device and may store other types of data.

Exemplary Data Processing Device

Figure 1:
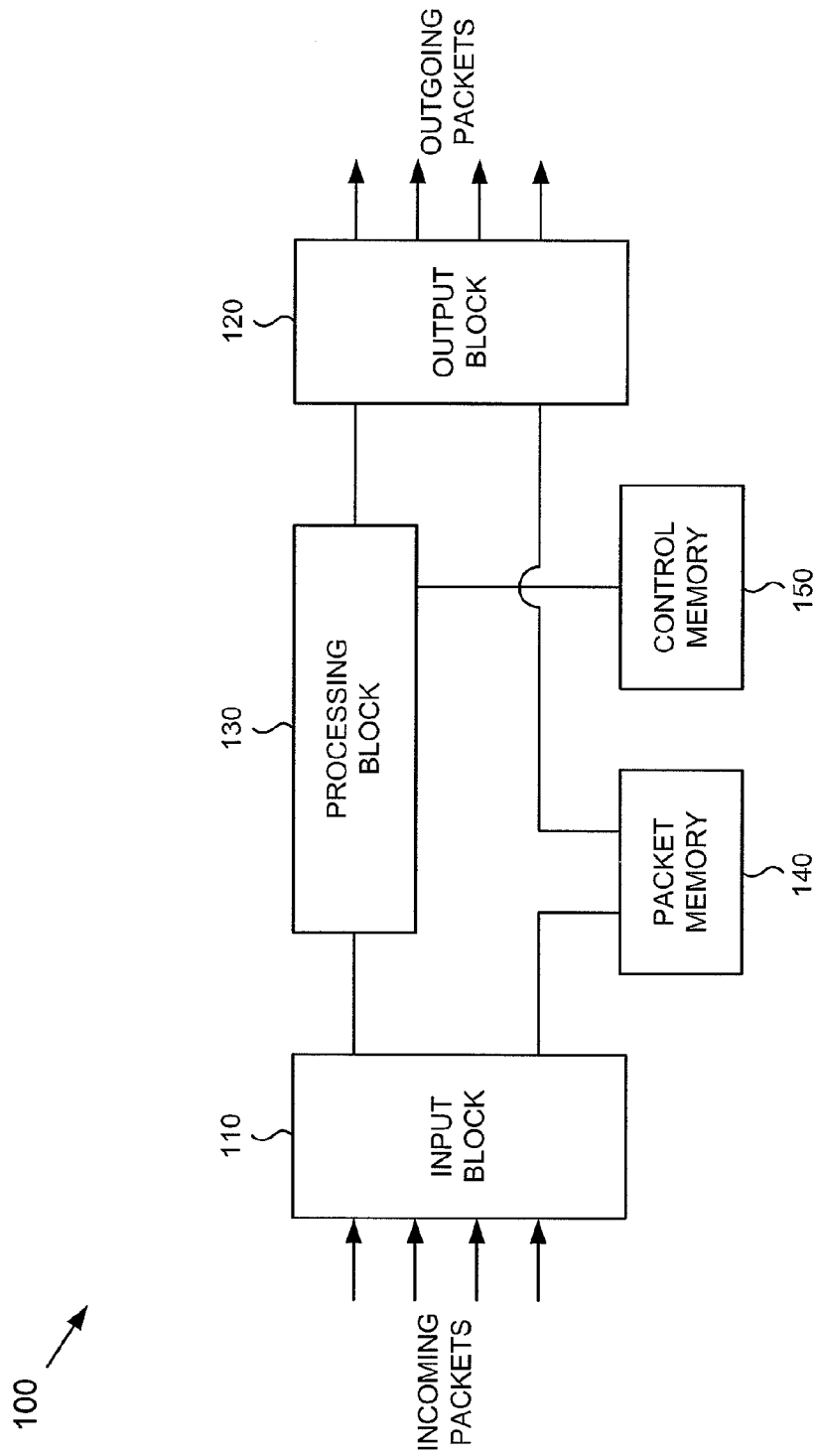
FIG. 1 is a diagram of an exemplary data processing device in which systems and methods described herein may be implemented.

FIG. 1 is a diagram of an exemplary data processing device 100 in which systems and methods described herein may be implemented. Device 100 may include input block 110, output block 120, processing block 130, packet memory 140, and control memory 150.

Input block 110 may include one or more input units (e.g., input line cards) that may receive packets on ingress links and perform initial processing on the packets. In one implementation, the initial processing may include analyzing a packet to identify its control information and its packet data (e.g., payload). The control information may include information from a header of the packet, and the packet data may include information from a payload of the packet. In one implementation, the control information may include a source address and/or a destination address from the header of a packet. In another implementation, the control information may include a source address, a destination address, priority information, and/or other information from the header of the packet. Output block 120 may include one or more output units (e.g., output line cards) that may receive packet information from processing block 130 and/or packet memory 140, construct packets from the packet information, and output the packets on egress links.

Processing block 130 may include processing logic that may perform routing functions and handle packet transfers between input block 110 and output block 120. Processing block 130 may receive the control information from input block 110 and process the control information based on data structures stored in control memory 150. When processing the control information, processing block 130 may make certain requests to control memory 150 to read and/or write data.

Figure 2:
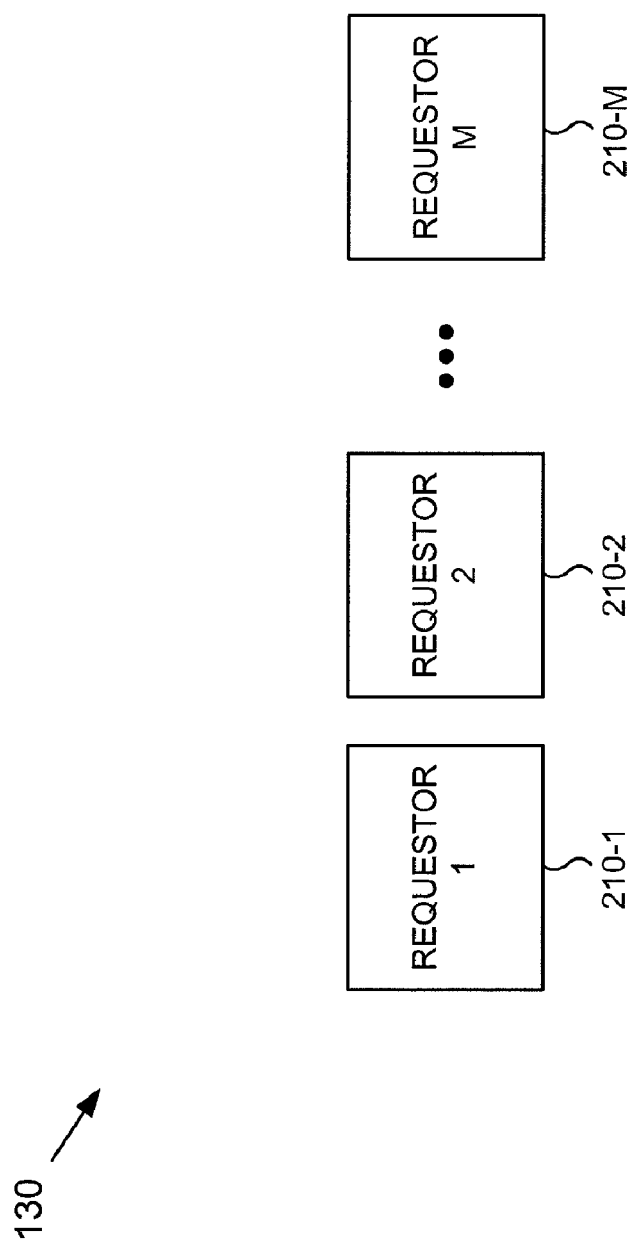
FIG. 2 is a diagram of an exemplary portion of the processing block of FIG. 1.

FIG. 2 is a diagram of an exemplary portion of processing block 130. Processing block 130 may include multiple requestors 210-1, 210-2, . . . , 210-M (where M>1) (collectively referred to herein as "requestors 210"). Requestors 210 may operate independently of each other and/or in parallel. Each of requestors 210 may include processing logic to process control information associated with a particular packet. Each of requestors 210 may make requests to control memory 150 to read and/or write data to assist in the processing of the control information. In one implementation, a requestor 210 may determine how to forward a packet (e.g., determine on which egress link the packet should be transmitted), collect particular statistics regarding the packet, and/or perform one or more management functions with regard to the packet.

Returning to FIG. 1, packet memory 140 may include a memory device, such as a dynamic random access memory (DRAM). Packet memory 140 may store packet data associated with packets received by input block 110. In one implementation, packet memory 140 may store the packet data as a variable length data unit. In another implementation, packet memory 140 may store the packet data as fixed length data units. In this case, the packet data may be divided into one or more of the data units of the fixed length and stored in contiguous or non-contiguous locations in packet memory 140. If stored in non-contiguous locations, data structures, such as linked lists, may be used to identify the data units associated with a particular packet.

Control memory 150 may include a memory device, such as a DRAM or a reduced-latency DRAM (RLDRAM). Control memory 150 may store data structures to assist in the processing of packets. In one implementation, the data structures might include a routing table, a forwarding table, statistics, and/or management data (e.g., quality of service (QoS) parameters).

Figure 3:
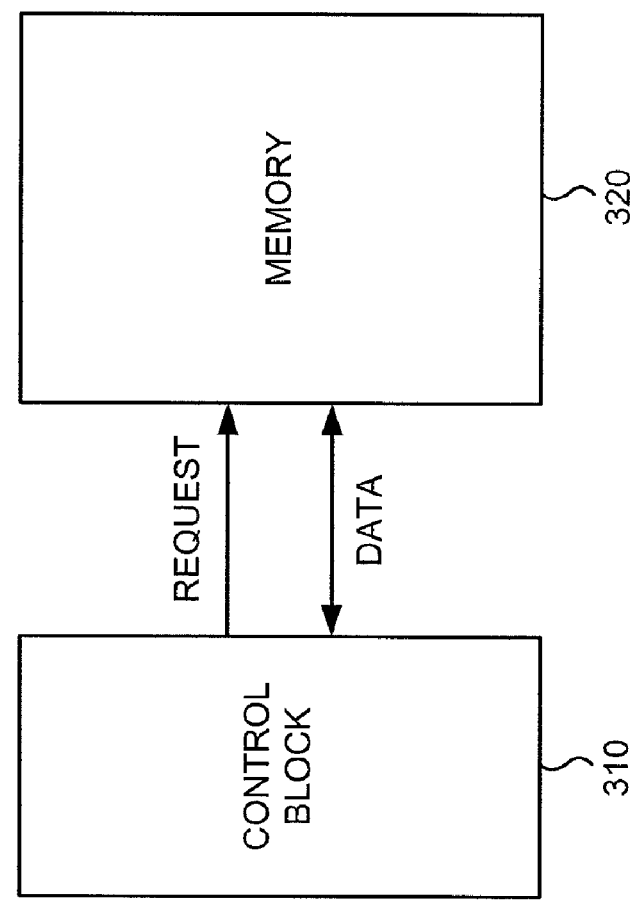
FIG. 3 is a diagram of an exemplary portion of the control memory of FIG. 1.

FIG. 3 is a diagram of an exemplary portion of control memory 150. Control memory 150 may include a control block 310 and a memory 320. Control block 310 may include logic that regulates access to memory 320. For example, control block 310 may receive requests from requestors 210 and regulate the sending of the requests to memory 320. In this case, control block 310 may function as an arbiter that arbitrates among the requests. Control block 310 may connect to memory 320 via a bus over which requests can be sent to memory 320 and data can be written to or read from memory 320.

Figure 4:
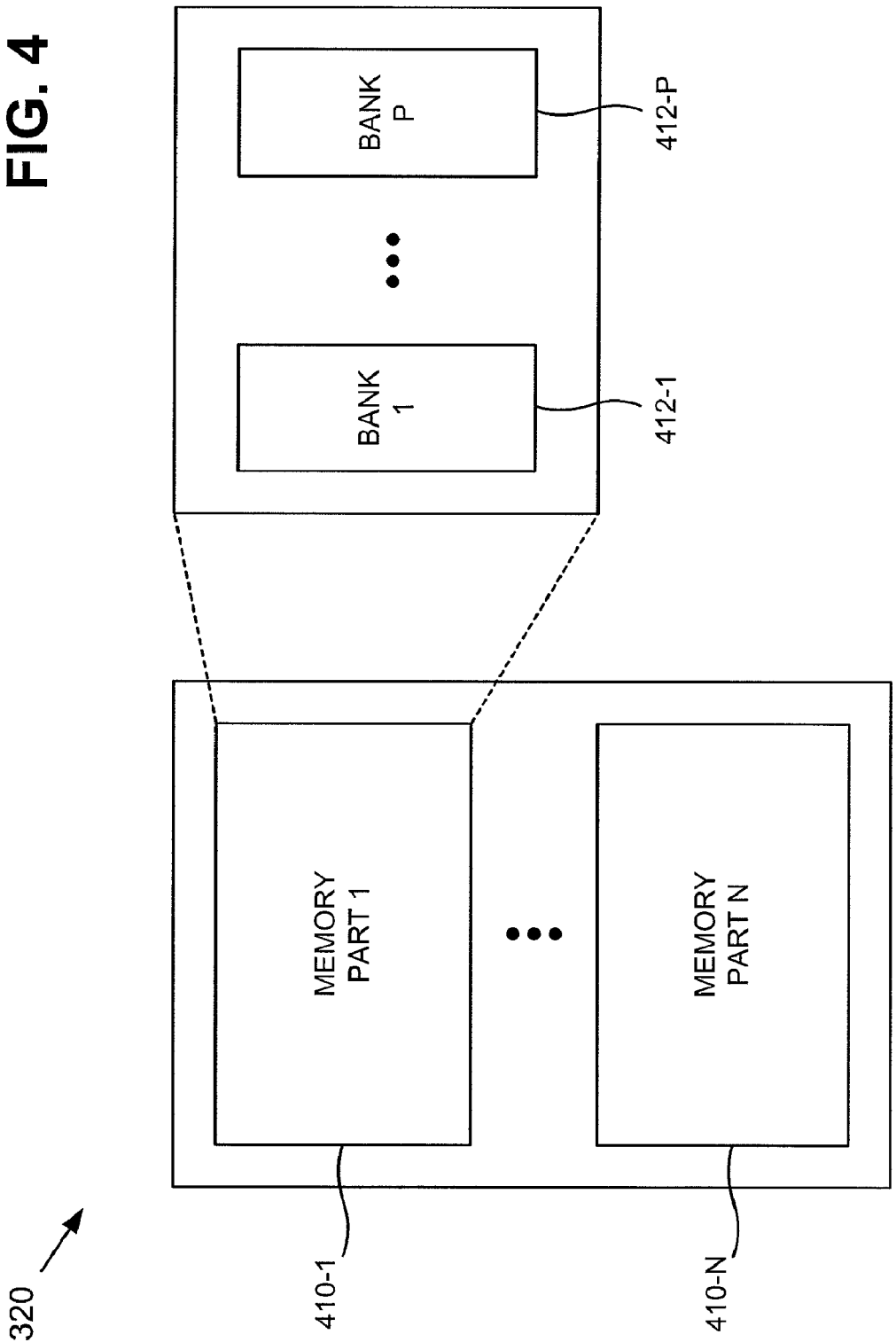
FIG. 4 is a diagram of an exemplary portion of the memory of FIG. 3.

Memory 320 may store the data structures. FIG. 4 is a diagram of an exemplary portion of memory 320. Memory 320 may include memory parts 410-1, . . . , 410-N (where N≧1) (collectively referred to herein as "memory parts 410"). In one implementation, each of memory parts 410 may store a replicated set of data. In another implementation, each of memory parts 410 may store a different set of data. Control block 310 may include a separate bus for each of memory parts 410, such that a separate request can be sent concurrently to each of memory parts 410. In this case, memory parts 410 may operate independently of each other. Reads may be performed on one of memory parts 410. Writes may be performed on all, or multiple ones, of memory parts 410 to maintain consistency.

Each of memory parts 410 may be organized into banks 412-1, . . . , 412-P (where P>1) (collectively referred to herein as "banks 412"). In one implementation, banks 412 may store data associated with any of requestors 210. In this case, any of requestors 210 may access any of banks 412. In another implementation, each of banks 412 may store data associated with a particular one or more of requestors 210. In this case, a particular one of banks 412 may be assigned to one or more of requestors 210.

Memory 320 may have a number of constraints that control access to memory 320. For example, memory 320 may have a restriction on how often a particular bank 412 can be accessed. For example, a restriction may specify that a certain number of clocks cycles (e.g., 3 clock cycles) pass between one access of a bank 412 and a subsequent access of that same bank 412 (herein referred to as "bank access delay"). Memory 320 may also have a refresh constraint. The refresh constraint may indicate the intervals at which a refresh operation is performed on each of banks 412. For example, the refresh constraint may indicate that all of banks 412 are refreshed every T clock cycles, where the value of T may be specified by the manufacturer of memory 320. The refresh constraint may not specify the order that banks 412 are refreshed or that only one bank 412 is refreshed at a time, thereby permitting a burst of refresh requests.

Exemplary Packet Forwarding Process

Figure 5:
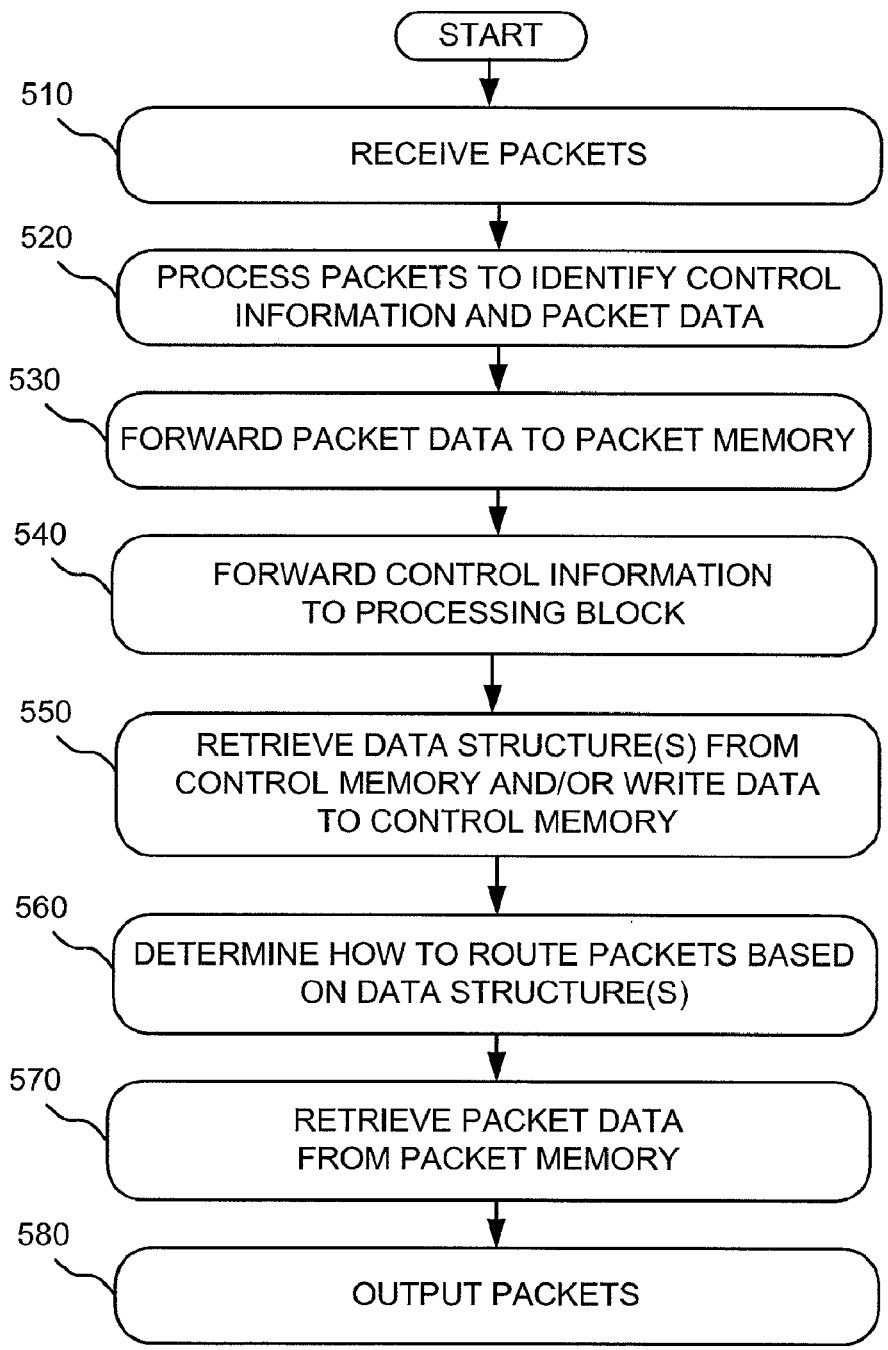
FIG. 5 is a flowchart of an exemplary process for forwarding a packet by the data processing device of FIG. 1.

FIG. 5 is a flowchart of an exemplary process for forwarding a packet by data processing device 100. Processing may begin with packets being received (block 510). For example, input block 110 may receive packets on one or more ingress links. The packets may be associated with a single stream of packets received on a particular ingress link or multiple streams of packets received on multiple ingress links.

The packets may be processed to identify their control information and their packet data (block 520). For example, input block 110 may analyze the packets to determine control information and packet data associated with the packets. As described above, the control information may be retrieved from the header of the packets and the packet data may be retrieved from the payload of the packets.

The packet data may be forwarded to packet memory 140 and the control information may be forwarded to processing block 130 (blocks 530 and 540). For example, input block 110 may send the packet data for storage in packet memory 140. As described above, the packet data associated with a particular packet may be stored in packet memory 140 as a variable sized data unit or as one or more fixed sized data units.

One or more data structures may be retrieved from control memory 150 and/or data may be written to control memory 150 (block 550). For example, a requestor 210 of processing block 130 may process control information associated with a packet. Requestor 210 may retrieve one or more data structures, such as a forwarding table, a routing table, and/or management data, from control memory 150. Requestor 210 may also, or alternatively, write one or more data structures, such as statistics data, to control memory 150. Requestor 210 may read or write data by sending a request to control memory 150. Requestors 210 may operate independently from each other and, thus, the requests from requestors 210 can form an unpredictable (almost random) access pattern across banks 412 of control memory 150.

It may be determined how to route the packets based on the one or more data structures retrieved from control memory 150 (block 560). For example, requestor 210 may process the control information for a packet based on the forwarding table, routing table, and/or management data to determine how the packet should be routed (e.g., on which egress link the packet should be transmitted, the priority to be given to the packet, etc.). Requestor 210 may send its processing results to output block 120. The processing results may identify the packet and the egress link on which the packet should be transmitted and might include header information associated with the packet.

Packet data may be retrieved from packet memory 140 (block 570). For example, output block 120 may receive processing results for a packet from a requestor 210 of processing block 130. Output block 120 may retrieve the packet data corresponding to the packet from packet memory 140 and reassemble the packet based on the packet data and the processing results from requestor 210.

The packets may be outputted on one or more egress links (block 580). For example, output block 120 may transmit the packets based on the processing results from requestors 210 of processing block 130.

Exemplary Functional Block Diagram of Control Memory

Figure 6:
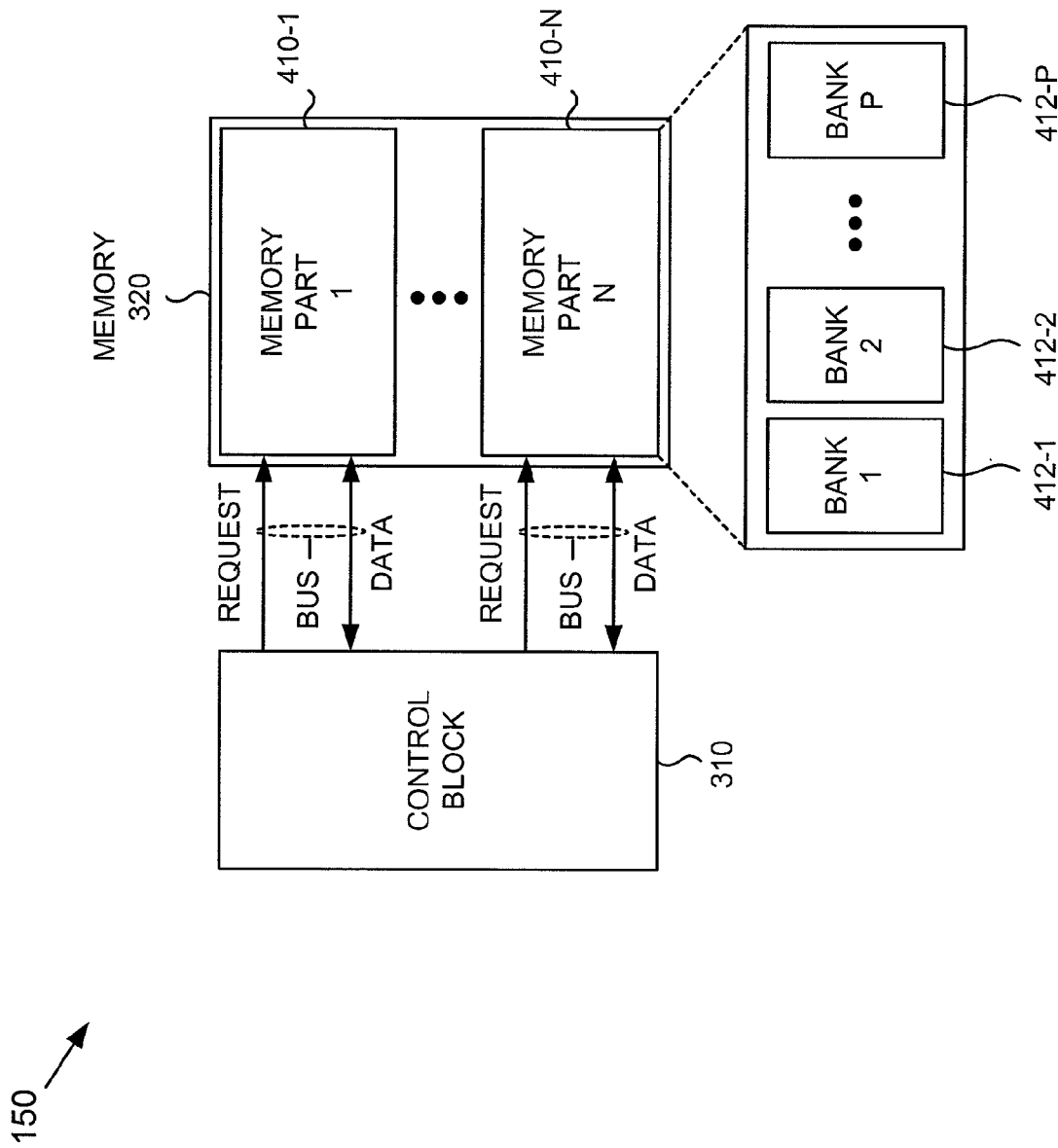
FIG. 6 is a functional block diagram of an exemplary portion of the control memory of FIG. 1.

Implementations described herein may relate generally to regulating access to control memory 150 and, more particularly, to controlling the sending of refresh requests for refreshing banks 412 of control memory 150. FIG. 6 is a functional block diagram of an exemplary portion of control memory 150. As shown in FIG. 6, control memory 150 may include control block 310 and memory 320, which may include N memory parts 410 that may each include P banks 412.

Control block 310 may control the refreshing of banks 412 of memory parts 410. As explained above, control block 310 may operate under certain memory constraints. For example, there may be a certain (finite) delay to access a bank 412 (e.g., a bank 412 may be inaccessible for a certain number of clock cycles after an access to that bank 412). Also, there may be a predetermined refresh constraint that may indicate that all of banks 412 are refreshed every T clock cycles. Further, there may be a single bus between control block 310 and each of memory parts 410, as shown in FIG. 6. A single refresh request may be sent from control block 310 to one of memory parts 410 via the bus during a given clock cycle.

Figure 7:
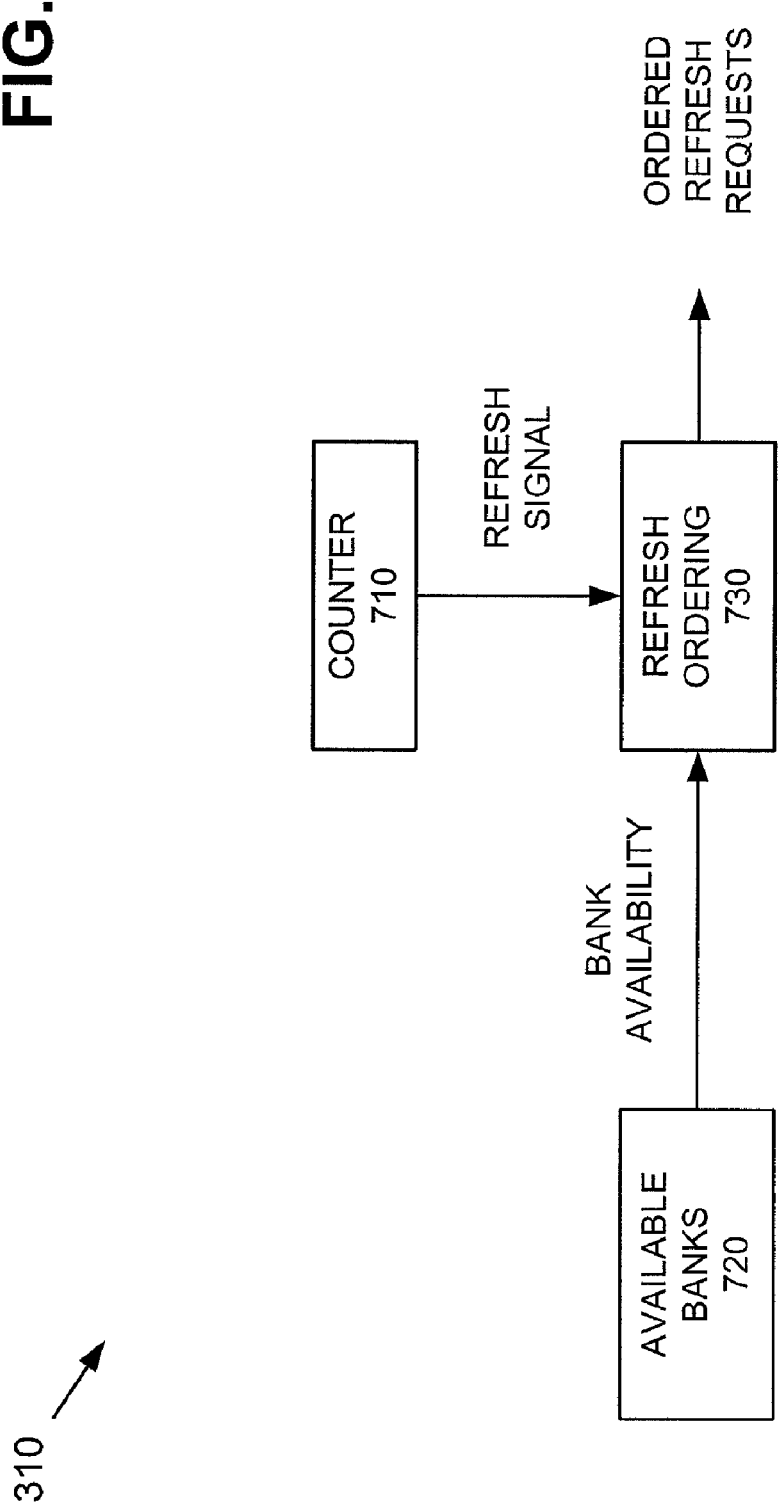
FIG. 7 is a diagram of an exemplary portion of the control block of FIG. 6.

FIG. 7 is a diagram of an exemplary portion of control block 310. As shown in FIG. 7, control block 310 may include a counter 710, an available banks unit 720, and a refresh ordering unit 730. Counter 710 may include a circular counter that increments to a count value of T and repeats. When counter 710 reaches a count value equal to T, counter 710 may output a refresh signal. The refresh signal may indicate the start of a refresh interval during which banks 412 need refreshing.

Figure 8:
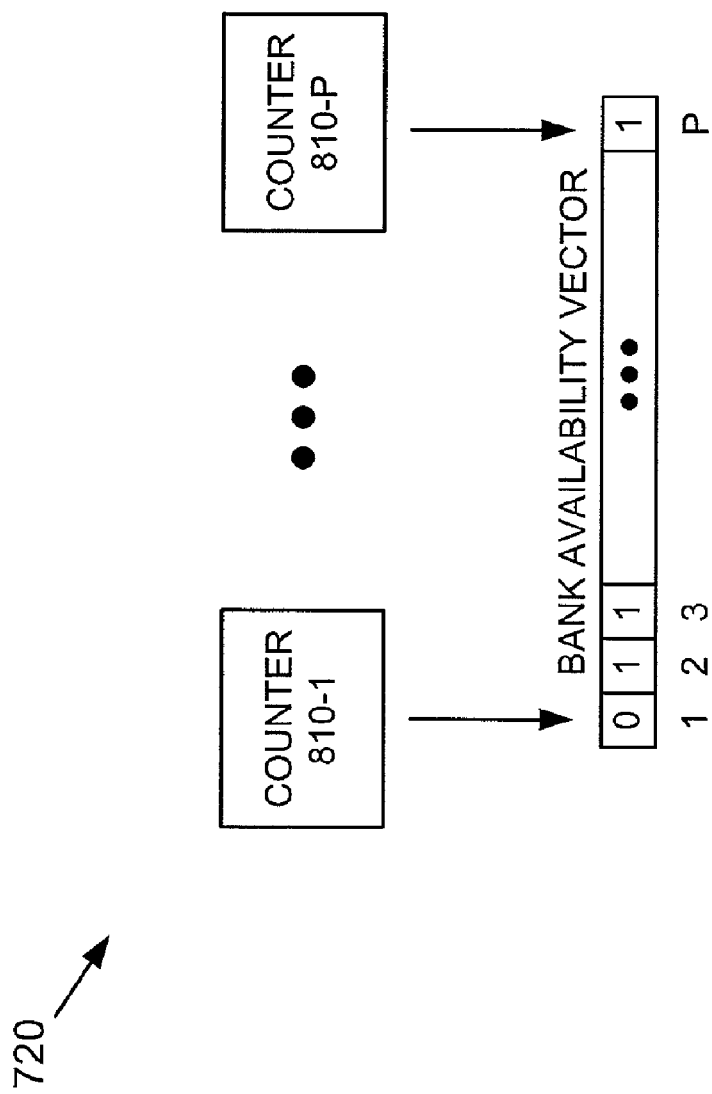
FIG. 8 is a diagram of the available banks unit of FIG. 7.

Available banks unit 720 may determine which of banks 412 are available in a given clock cycle. FIG. 8 is a diagram of available banks unit 720. As shown in FIG. 8, available banks unit 720 may maintain a number of counters 810-1, . . . , 810-P (collectively referred to as "counters 810") that may be associated with banks 412-1, . . . , 412-P of one of memory parts 410. Similar counters may be associated with banks 412 of the other one of memory parts 410.

In one implementation, each of counters 810 is set to a predetermined value whenever a request is sent to the corresponding bank 412. The predetermined value may correspond to the bank access delay (in clock cycles) associated with banks 412. Thus, a counter 810 may reflect how many clock cycles to wait before another access to the corresponding bank 412 can occur. In one implementation, counters 810 may count downward from the predetermined value to a zero value. Any counter 810 with a non-zero value may indicate that the corresponding bank 412 is unavailable for access. Any counter 810 with a zero value may indicate that the corresponding bank 412 is available for access.

Available banks unit 720 may generate a bank availability vector for each of memory parts 410 based on the count values of counters 810. The bank availability vector may indicate whether each of the corresponding banks 412 is available for access. The bank availability vector may include a number of bits corresponding to the number of banks 412. A bit may be set to a first value to indicate that the corresponding bank 412 is available or to a second value to indicate that the corresponding bank 412 is unavailable. In one implementation, available banks unit 720 may generate a bank availability vector in each clock cycle to indicate which banks 412 are available during that clock cycle. For example, assume that counters 810 indicate that banks 412-2, 412-3, and 412-P are available and the other banks 412 are unavailable. In this case, available banks unit 720 may generate a bank availability vector in which bit 2, bit 3, and bit P are set to the first value and the other bits are set to the second value, as shown in FIG. 8.

Returning to FIG. 7, refresh ordering unit 730 may determine an order in which banks 412 may be serviced for refreshing. Refresh ordering unit 730 may determine the order so as to minimize the number of clock cycles required to send refresh requests to each of banks 412. In one implementation, refresh ordering unit 730 may identify the availability of banks 412 from information in the bank availability vector, and determine the order for the refresh requests based on the availability of banks 412. For example, refresh ordering unit 730 may select, in each clock cycle, a refresh request for an available bank 412 to send to memory 320.

Refresh ordering unit 730 may provide flexible ordering of the refresh requests to minimize the duration of the refresh operation based on the availability of banks 412. Refresh ordering unit 730 may form a refresh burst based on the refresh requests and the determined order. In one implementation, refresh ordering unit 730 may determine the availability of banks 412 at each clock cycle of the refresh interval and select one of banks 412 to service during that clock cycle. In another implementation, refresh ordering unit 730 may select the order for servicing banks 412 at the beginning of the refresh interval rather than at each clock cycle within the refresh interval. In this case, refresh ordering unit 730 may determine the order such that any bank 412 that is determined to be unavailable at the beginning of the refresh interval is scheduled after a number of clock cycles equal to the bank access delay in clock cycles. For example, if the bank access delay is 3 clock cycles, then an unavailable bank 412 may be scheduled at clock cycle 4 of the refresh interval or later.

Figure 9:
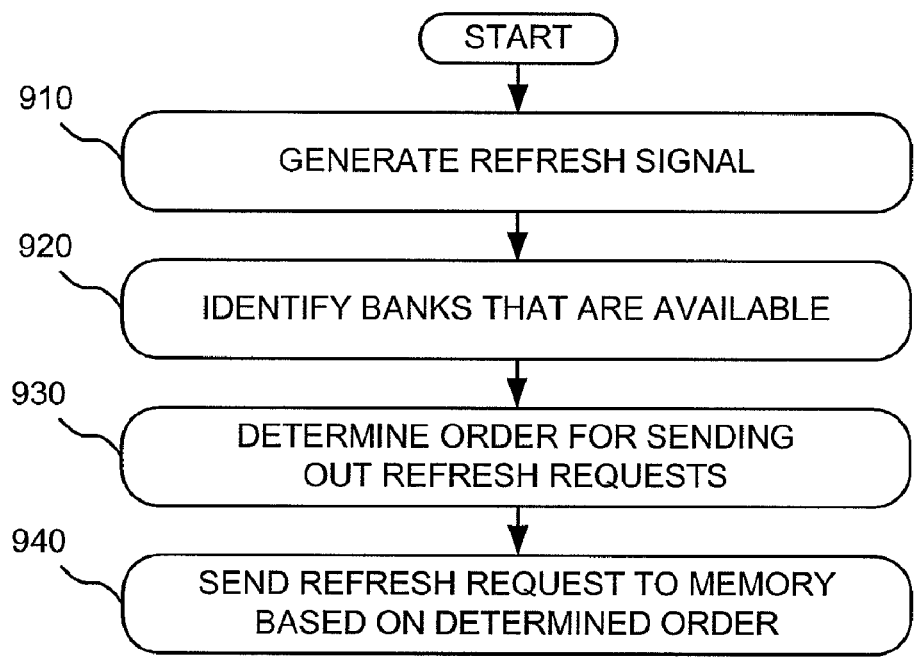
FIG. 9 is a flowchart of an exemplary process for servicing refresh requests.

FIG. 9 is a flowchart of an exemplary process for servicing refresh requests. Processing may begin with a refresh signal being generated (block 910). For example, counter 710 (FIG. 7) may increment to a count value of T and output the refresh signal. As explained above, the refresh signal may signify the beginning of a refresh interval during which banks 412 are refreshed.

Banks 412 that are available (per memory part 410) may be identified (block 920). For example, available banks unit 720 may analyze the count values of counters 810 corresponding to banks 412. Available banks unit 720 may generate a bank availability vector, based on the count values, that identifies which of banks 412 are available to service a refresh request. As described above, a zero count value may indicate a bank 412 that is available.

An order for sending the refresh requests to memory 320 may be determined (block 930). For example, refresh ordering unit 730 may determine an order for the refresh requests based on the availability of banks 412. In one implementation, refresh ordering unit 730 may flexibly order the refresh requests to minimize the duration of the refresh interval and minimize the number of idle clock cycles. For example, refresh ordering unit 730 may determine the order such that a bank 412 that is determined to be unavailable may be scheduled (if possible) no earlier than when that bank 412 becomes available.

A refresh request may be sent to memory based on the determined order (block 940). For example, in a given clock cycle, control block 310 may send a refresh request to the corresponding bank 412 in the determined order.

Based on the foregoing, control block 310 may flexibly order the refresh requests sent to memory 320 during a refresh interval to minimize the number of idle clock cycles that occur during the refresh interval and, thereby, minimize the duration of the refresh interval. Consider two examples: a first example where refresh requests are serviced simply in a round robin fashion based on bank number; and a second example where refresh requests are serviced based on the availability of the banks. Assume for these examples that there are 8 banks (i.e., banks 1-8) that are to be refreshed in a refresh interval. Assume that banks 1, 4, and 6 are unavailable and the remaining banks are available at the beginning of the refresh interval. Assume further that the bank access delay associated with banks 1-8 indicates that three clock cycles pass between an access to a bank and a subsequent access to that same bank.

FIG. 10 is a diagram that illustrates the first example. As shown in FIG. 10, control block 310 may service the refresh requests for banks 1-8 in a round robin fashion. In this case, it takes 11 clock cycles to service all of the pending refresh requests. Due to the bank access delay associated with banks 1, 4, and 6, three clock cycles occur in which no refresh request is serviced (i.e., clock cycles 0-2). In this case, these three clock cycles are idle while control block 310 waits for bank 1 to become available.

FIG. 11 is a diagram that illustrates the second example. Control block 310 may identify banks 1, 4, and 6 as unavailable and, thus, order the refresh requests in the order 2, 3, 5, 1, 4, 6, 7, and 8. As shown in FIG. 11, control block 310 may service a refresh request for banks 2, 3, and 5 prior to servicing a refresh request for bank 1 when bank 1 becomes available. In this case, it takes eight clock cycles to service all of the refresh requests with no idle clock cycles. This is three clock cycles sooner than in the first example.

CONCLUSION

Implementations described herein may provide techniques for ordering refresh requests for servicing by a memory device. The refresh requests may be ordered to minimize the duration of the refresh interval. As a result, the duration of the refresh interval may be deterministic in the sense that it will be known beforehand how many clock cycles it will take to complete the refresh operation.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 9, the order of the blocks may differ in other implementations. Also, non-dependent blocks may be performed in parallel.

Further, certain portions of the description referred to "logic" that performs one or more functions. This logic may include hardware, such as a processor, an application specific integrated circuit, or a field programmable gate array, software, or a combination of hardware and software.

It will also be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A data processing device, comprising:
a memory that includes a plurality of banks; and
a control block to:
generate a refresh signal,
determine an availability of the plurality of banks,
determine an order for sending refresh requests to the plurality of banks based on the availability of the plurality of banks, where:
the order is determined before sending the refresh requests to the plurality of banks,
a first one of the plurality of banks is associated with a bank access delay that is greater than zero, and
one or more second banks, of the plurality of banks, are placed, in the order, before the first one of the plurality of banks, where a number of the one or more second banks placed before the first one of the plurality of banks equals the bank access delay associated with the first one of the plurality of banks, and
send a refresh request to each of the one or more second banks before sending a refresh request to the first one of the plurality of banks.

2. The data processing device of claim 1, where the control block includes:
a counter to:
increment a count value, and
generate the refresh signal when the count value equals a predetermined count value.

3. The data processing device of claim 2, where the refresh signal indicates a beginning of a refresh interval.

4. The data processing device of claim 1, further comprising:
a plurality of counters corresponding to the plurality of banks, the counters having associated count values; and
where the control block is further to:
determine the count values associated with the counters, and generate a bank availability vector based on the determined count values, the bank availability vector identifying one or more of the plurality of banks that are available during a particular clock cycle.

5. The data processing device of claim 1, where when determining the order for sending the refresh requests, the control block is further to determine an order in which the plurality of banks are to be serviced to minimize a number of clock cycles required to send the refresh requests to the plurality of banks.

6. The data processing device of claim 1, where when determining the order for sending the refresh requests, the control block is further to identify a next one of the refresh requests to send at each clock cycle.

7. The data processing device of claim 1, where when determining the order for sending the refresh requests, the control block is further to determine an order in which the plurality of banks are to be serviced to minimize a number of idle clock cycles that occur when sending the refresh requests to the plurality of banks.

8. The data processing device of claim 1, where the first one of the plurality of banks is associated with a bank access delay that is greater than one.

9. The data processing device of claim 8, where the bank access delay equals three clock cycles.

10. A method, comprising:
periodically generating a refresh signal to identify a beginning of a refresh interval;
determining an availability of banks of a memory device;
determining a servicing order for sending refresh requests to the banks based on the availability of the banks, where
the servicing order is determined prior to sending the refresh requests to the banks,
a first one of the banks is associated with a bank access delay that is greater than zero, and
one or more second banks, of the banks of the memory device, are placed, in the servicing order, before the first one of the banks, where a number of the one or more second banks placed before the first one of the banks equals the bank access delay associated with the first one of the banks; and
sending a refresh request to each of the one or more second banks before sending a refresh request to the first one of the banks.

11. The method of claim 10, where periodically generating the refresh signal includes:
incrementing a count value of a counter, and
generating the refresh signal when the count value equals a predetermined count value.

12. The method of claim 10, where determining the availability of the banks includes:
determining count values associated with a plurality of counters, where each of the counters is associated with one of the banks, and
generating a bank availability vector based on the determined count values, the bank availability vector identifying one or more of the banks that are available during a particular clock cycle.

13. The method of claim 10, where the determining a service order is based on sending the refresh requests to the banks to minimize a number of clock cycles in the refresh interval.

14. The method of claim 10, further comprising:
identifying a next one of the refresh requests to send to one of the banks at each clock cycle of the refresh interval.

15. The method of claim 10, further comprising:
determining an order for sending the refresh requests to the banks to minimize a number of idle clock cycles that occur during the refresh interval.

16. The method of claim 10, where the first one of the banks is associated with a bank access delay that is greater than one.

17. The method of claim 16, where the bank access delay equals three clock cycles.

18. A non-transitory computer-readable medium that stores computer-executable instructions, comprising:
one or more instructions to generate a refresh signal;
one or more instructions to determine an availability of a plurality of banks;
one or more instructions to determine an order for sending refresh requests to the plurality of banks based on the availability of the plurality of banks, where:
the order is determined before sending the refresh requests to the plurality of banks,
a first one of the plurality of banks is associated with a bank access delay that is greater than zero, and
one or more second banks, of the plurality of banks, are placed, in the order, before the first one of the plurality of banks, where a number of the one or more second banks placed before the first one of the plurality of banks equals the bank access delay associated with the first one of the plurality of banks; and
one or more instructions to send a refresh request to each of the one or more second banks before sending a refresh request to the first one of the plurality of banks.

19. The computer-readable medium of claim 18, where the first one of the plurality of banks is associated with a bank access delay that is greater than one.

20. The computer-readable medium of claim 19, where the bank access delay equals three clock cycles.

* * * * *